UNITED STATES PATENT OFFICE.

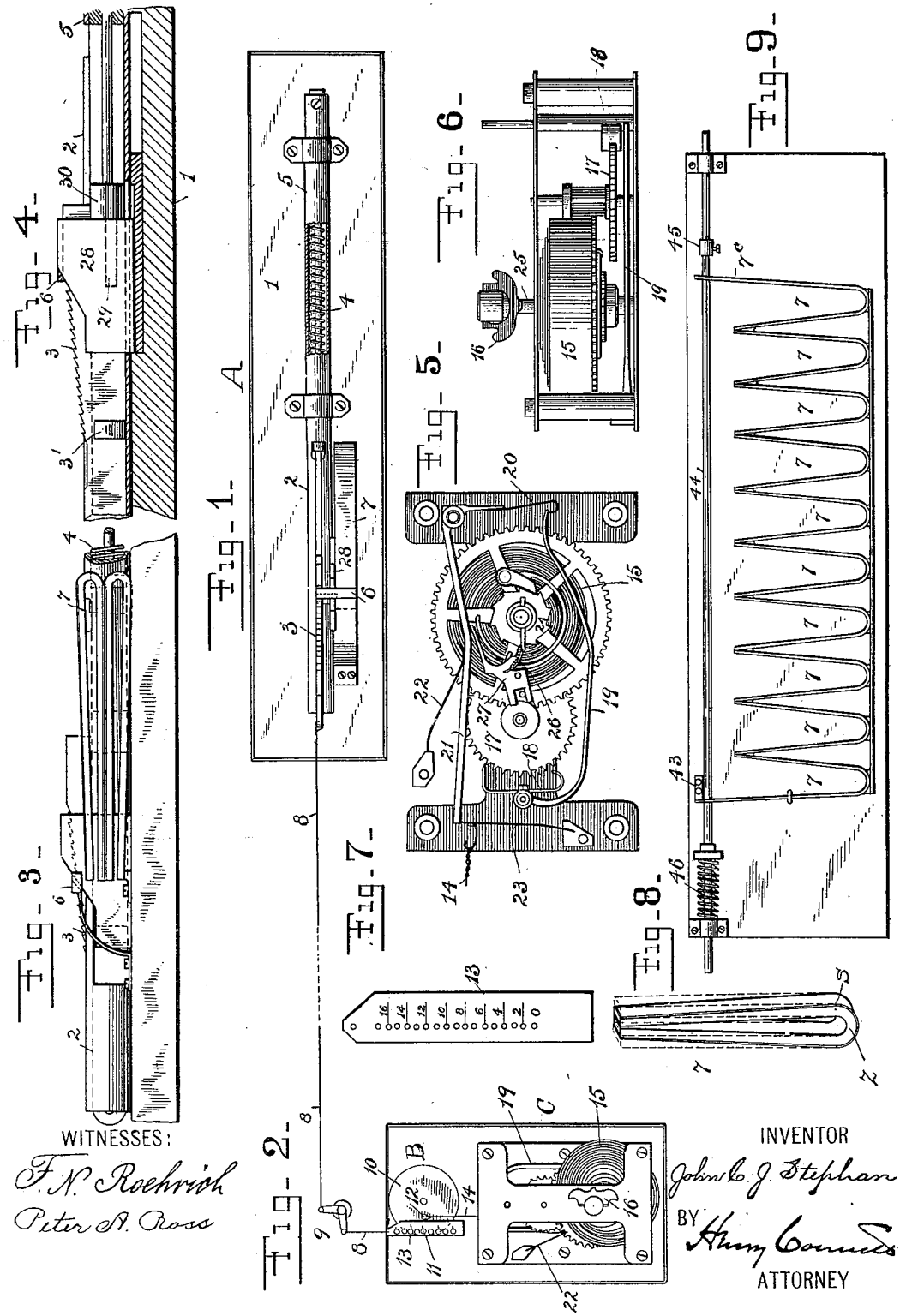

JOHN C. J. STEPHAN, OF NEW YORK, N. Y.

THERMO-ANNUNCIATOR.

SPECIFICATION forming part of Letters Patent No. 659,002, dated October 2, 1900.

Application filed April 7, 1900. Serial No. 11,940. (No model.)

*To all whom it may concern:*

Be it known that I, JOHN C. J. STEPHAN, a citizen of the United States, and a resident of the city of New York, borough of Queens, county of Queens, and State of New York, have invented certain new and useful Improvements in Thermo-Annunciators, of which the following is a specification.

This invention relates to devices for announcing by sound a variation in temperature at a certain place above or below a predetermined point—as, for example, announcing the breaking out of a fire in a room or stable or the like.

Two forms of the annunciating apparatus are herein shown, one adapted for sounding an annunciator situated at some distance from the point or place where the temperature rises and the other adapted as a portable device or apparatus combining the thermostat, the regulator, and the sounder, all in one casing.

In the accompanying drawings, which illustrate the invention, Figure 1 is a plan of the thermostatic part of the apparatus, and Fig. 2 is a plan of the annunciator and regulator thereof. These views are on a relatively-small scale. Fig. 3 is a side elevation of the thermostatic part of the apparatus, and Fig. 4 is a sectional elevation of the same. Fig. 5 is an under side view, and Fig. 6 a side elevation, of the annunciator. Fig. 7 is a view of the regulator-plate detached. Fig. 8 is a view of the thermostat in its simplest form, and Fig. 9 illustrates a compound form of same.

Referring primarily to Figs. 1 to 7, A represents as a whole the thermostatic device, B the regulator as a whole, and C the sounder or annunciating device. The device A will be placed at the point where one wishes to note any rise, for example, of the temperature above a certain point, as in a coal-bunker on shipboard or in a barn or building separated from a house or office. When the temperature rises above the point or degree set and indicated at the regulator B, the sounding device C will be set off and announce it. The regulator and sounder may be together and may be placed in the office, for example, where they will be under constant attention or notice. The thermostatic device A will first be described.

On any suitable base 1 is mounted a guide 2, in which slides a toothed rack 3, connected to an extension-spring 4, which may be conveniently inclosed in a tubular casing 5. The rack 3 is inclined on its toothed upper edge, as clearly shown in Fig. 4, and on the base 1 by its side is mounted a spring-pawl 6, which may engage and does normally engage a tooth of said rack. When the rack is drawn out toward the left in Fig. 1 under the pawl 6, the latter will engage with the rack and hold it against the tendency of the spring 4 to draw it back. On the base is mounted a thermostat 7, which when expanded by the heat or rise in temperature, takes under the pawl 6, raises it free from the rack 3, and allows the spring to draw the latter back forcibly along its guide. The thermostat 7 has some peculiarities, which will be described. It consists in its primary form of a strip or plate of steel and a strip or plate of zinc soldered together face to face and having a U form. In Fig. 8, which shows the thermostat detached, *s* represents the exteriorly-situated steel strip and *z* the interiorly-situated zinc strip. As zinc expands to a greater extent under a given temperature than steel, the effect of a rise in temperature is to expand the branches of the U or cause them to separate, while a fall in temperature brings them closer together. By connecting two or more of these U-shaped pieces or elements together at their branched ends the combined expansion of the whole may be utilized. Two of such elements are shown in Fig. 3.

The rack 3 is connected by a wire 8 with the regulator B either directly or through one or more bell-cranks 9, and the regulator may be at any desired distance from the thermostatic device A. This regulator B may be constructed in various ways; but as herein shown it consists of a rotatable disk 10, having in it two crank-pins, 11 and 12. Attached to the wire 8 is a graduated strip 13, perforated at the graduations, any one of which may be made to engage the pin 11 by drawing out the inclined rack 3. The farther the rack is drawn out the higher will the pawl 6 be raised above the thermostat 7 and the higher the temperature at the thermostat will have to rise before the latter will expand sufficiently to disengage the pawl. The graduations on the strip 13 may indicate degrees of temperature at which the thermostat will act to disengage the pawl. The other pin 12 in the disk 10 is connected by a wire 14 or the like with the sounder C for setting off the latter. This sounder comprises as its essentials a clock-spring 15, adapted to be wound by a key 16 and connected by a suitable train of gears with an escapement-wheel 17. With the teeth of this wheel engage the pallets of an ordinary escapement 18, which has an arm 19, adapted to be engaged, Fig. 5, by a spring hook-arm 20 on a rocker-arm 21, backed by a spring 22. The hook-arm 20 by engaging the escapement-arm 19 holds the sounder against movement, and the hook-arm is held normally in engagement with the arm 19 by a spring-detent 23, which takes under the end of the rocker-arm 21. The wire 14 is connected to the detent 23, and when the pawl 6 frees the ratchet 3 the spring 4, acting through the wires or connectors 8 and 14, draws back the detent 23 and permits the arm 21 to rock and free the hook-arm 20 from the escapement-arm, thus setting off the sounder.

In setting the apparatus for operation the user may draw on the wire or connector 8 through the medium of the perforated plate or strip 13 until the properly-numbered aperture therein will take over the pin 11, the teeth in the ratchet 3 corresponding in spacing with the spacing of the said perforations. He then winds up the annunciator or sounder C by means of the key 21. In doing this a beveled stud 24 on the winding-arbor 25 wipes over a spring-arm 26 on a rocker 27, which takes under the rocker-arm 21 and presses it back or outward, so that the spring-detent 23 may move in under its end and support it. The power of the spring 15, acting on the wheel 17, forces the escapement-arm 19 into engagement with the spring hook-arm 20, and thus holds the sounder until set off as described.

In case the user desires to set the regulator at a lower degree than it is already set, means are provided for letting back the rack 3 to its full extent, so that it may be drawn out to just the desired extent. To effect this, an inclined cam-slide 28, Figs. 3 and 4, is mounted slidably at the side of the rack 3 and preferably between the thermostat 7 and said rack. This cam-slide has on its face next to the rack a lug 29, (seen in dotted lines in Fig. 4,) which is adapted to be impinged upon by lugs 30 and 31 on the rack as the latter moves to and fro. When the rack 3 is drawn out to its full extent, as in Fig. 4, the lug 30 drives the cam-slide forward under the spring-pawl 6, thus elevating it above the highest point of the rack, and when the spring 4 is allowed to retract the rack quickly the cam-slide will uphold the pawl until the lug 31 impinges on the lug 29 on the slide and moves the latter back to the position seen in Fig. 3.

Fig. 9 shows a compound form of the thermostatic device, which might be employed in lieu of that shown in Figs. 1, 3, and 4; but in this case the regulator would be situated adjacent to the thermostatic device. In the construction of Fig. 9, 7 represents a plurality of U-shaped thermostats like that seen in Fig. 8, but connected together, so that the expansion of the whole set is a multiple of the expansion of each—that is to say, the several thermostats are arranged abreast with their prongs presented in one direction and the prong of one secured at its extremity to the prong of that next adjacent. The device is fixed at one end to a base at 43, and at the other end a wire or rod 44 is threaded loosely through its branch $7^c$. At the left the wire 44 is supposed to be connected to the detent 23 of the sounder, and beyond where it passes through the branch $7^c$ at the right in Fig. 9 there is a button or collar 45 on the rod, which may be set at any desired distance from the said branch. 46 is an extension-spring to retract the rod 44. The collar 45 is adjusted and fixed on the rod so that a certain degree of expansion of the compound thermostat will impinge upon it, draw the rod, and thus draw back the detent 23 and set off the sounder.

Obviously some changes in the construction of the apparatus may be made without departing materially from my invention. I do not claim a spring-actuated sounder *per se*, nor is my invention restricted to the particular sounder here shown. The regulator illustrated in Figs. 2 and 7 is simple in form; but obviously other simple constructions may be employed as well. The object is to provide a take-up for the connector 8 which is measurable in extent, and this may be done by any simple means.

In case the device A be set to operate, say, at 100° Fahrenheit and be in a coal-bunker of a vessel, for example, and the officer hears the sounder he may by means of the regulator set the device A to sound at 110° and await a confirmation of the alarm. If the sounder is set off at 110°, he may feel assured that there is overheating and attend to the matter at once. The portable device may be set to sound at; say, 75° in any room and it will at once notify the user when the temperature reaches that point.

The apparatus is wholly mechanical, no electric circuit being employed, and the danger from broken circuits, weakened batteries, bad contacts, &c., thus avoided.

Obviously the sounder of Figs. 2, 5, and 6 may be inclosed in a practically dust-proof case, if desired, as an aperture for the entry of the connector 14 is all that is needed, and the connector may fit such aperture very snugly.

It may be well to say here that while I prefer to solder together the steel and zinc elements, both being of metal, and to put the zinc element inside, so that the branches will expand, nevertheless I do not limit myself to these features. The zinc and steel elements may be secured together by other means than solder, and good results may be produced by putting the element which has the highest coefficient of expansion outside, so that the branches will move together under the influence of heat. The U-shaped form of thermostat shown is not in itself novel; but the manner of connecting them together as illustrated is new, so far as I am aware.

Having thus described my invention, I claim—

1. In a thermo-annunciator, the combination with an annunciator or sounder adapted to be set off by the movement of a detent, and the said detent, of a thermostatic device comprising a rack connected with and adapted when freed to operate said detent, a pawl to engage and hold said rack, and a thermostat adapted to actuate said pawl and free the rack when the temperature at the thermostat reaches a predetermined point.

2. In a thermo-annunciator, the combination with an annunciator or sounder adapted to be set off by the movement of a detent, the said detent, and a thermosatatic device comprising a rack connected with and adapted, when freed, to operate said detent, a pawl to engage and hold said rack, and a thermostat adapted to actuate said pawl and free the rack when the temperature at the thermostat reaches a predetermined point, and means for setting and holding said pawl at a predetermined distance from the thermostat, normally, substantially as and for the purposes set forth.

3. In a thermo-annunciator, the combination with the sounder, the detent for setting the sounder in operation, the connector, and a regulator for varying the length of the connector, of a thermostatic apparatus comprising the slidable, tapered or inclined rack 3, its retracting-spring, a spring-pawl 6, to engage said rack, and a thermostat adapted to disengage said pawl from the rack, substantially as set forth.

4. The combination of the guide 2, the inclined rack 3, mounted slidably in said guide, the spring 4, for retracting the rack, the spring-pawl 6, engaging the teeth of the rack, and the thermostat 7, at the side of the rack and taking under said pawl, whereby expansion of said thermostat lifts said pawl from engagement with the rack-teeth, substantially as set forth.

5. The combination with the sounder, having an operating-spring and escapement device, a rocker-arm 21, means between said arm and the escapement device for locking the latter through said arm, and a detent 23 for holding said arm, of means for setting the arm 21 in winding, comprising the stud 24, and the rocker 27 which acts on the arm 21, said rocker having a spring-arm 26, substantially as set forth.

6. In a thermo-annunciator, the combination with an annunciator, of a thermostatic device for setting the latter, said device comprising a movable rack, a pawl to hold said rack against movement, and a thermostat adapted to actuate said pawl to free the rack when the temperature at the thermostat reaches a predetermined point, and operative means between said rack and annunciator whereby the latter is set in operation.

In witness whereof I have hereunto signed my name, this 4th day of April, 1900, in the presence of two subscribing witnesses.

JOHN C. J. STEPHAN.

Witnesses:
HENRY CONNETT,
PETER A. ROSS.